United States Patent
Lee et al.

(10) Patent No.: US 10,211,910 B2
(45) Date of Patent: Feb. 19, 2019

(54) INTERFERENCE CANCELLATION REPEATER

(71) Applicants: SOLiD, INC., Seongnam-si, Gyeonggi-do (KR); SOLIDSYSTEMS CO., LTD., Gyeonggi-do (KR)

(72) Inventors: Hyunbeom Lee, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/540,643

(22) PCT Filed: Dec. 21, 2015

(86) PCT No.: PCT/KR2015/014057
§ 371 (c)(1),
(2) Date: Sep. 14, 2017

(87) PCT Pub. No.: WO2016/108488
PCT Pub. Date: Jul. 7, 2016

(65) Prior Publication Data
US 2018/0034533 A1    Feb. 1, 2018

(30) Foreign Application Priority Data

Dec. 30, 2014    (KR) .................. 10-2014-0194375

(51) Int. Cl.
H04B 7/155    (2006.01)
(52) U.S. Cl.
CPC ......... *H04B 7/15585* (2013.01); *H04B 7/155* (2013.01); *H04B 7/15535* (2013.01); *H04B 7/15571* (2013.01)

(58) Field of Classification Search
CPC ............ H04B 7/15585; H04B 7/15535; H04B 7/15571
See application file for complete search history.

(56) References Cited

U.S. PATENT DOCUMENTS 9,929,793 B2 *    3/2018   Kummetz .......... H04B 7/15585
2014/0335779 A1 *  11/2014  Kim .................... H04W 52/245
                                                                  455/10

FOREIGN PATENT DOCUMENTS

KR    10-2012-0012090 A    2/2012
KR    10-1243333 B1    3/2013

OTHER PUBLICATIONS

Korean Office Action for 10-2014-0194375 dated Jan. 31, 2017.

* cited by examiner

*Primary Examiner* — Afshawn M Towfighi
(74) *Attorney, Agent, or Firm* — Sughrue Mion, PLLC (57) ABSTRACT

According to an aspect of the inventive concept, there is provided an interference cancellation repeater for repeating a long term evolution (LTE) signal between a terminal and a base station, the interference cancellation repeater includes: an interference canceller configured to generate a restored LTE signal by canceling a feedback signal included in an input LTE signal; a sync signal detector configured to detect a first sync level which is a level with respect to a sync signal of the input LTE signal and a second sync level which is a level with respect to a sync signal of the restored LTE signal; and a gain controller configured to control a signal amplifier according to isolation calculated based on a difference between the first sync level and the second sync level.

8 Claims, 6 Drawing Sheets

INTERFERENCE CANCELLATION REPEATER

CROSS-REFERENCE TO RELATED APPLICATIONS

This application is a National Stage of International Application No. PCT/KR2015/014057, filed Dec. 21, 2015, and claims priority from Korean Patent Application No. 10-2014-0194375, filed Dec. 30, 2014, the contents of which are incorporated herein by reference in their entireties.

BACKGROUND

1. Field

The inventive concept relates to an interference cancellation repeater, and more particularly, to an interference cancellation repeater capable of stable operation irrespective of characteristics of a radio signal.

2. Description of the Related Art

In a mobile communication system, a repeater performs intermediate amplification between a base station and a mobile station (mobile communication terminal) and extends coverage of the corresponding base station when a propagation environment is poor and a distance from the base station is long. The repeater filters and amplifies signals by frequency band to provide mobile communication services to areas blocked or isolated from the outside.

Frequencies of radio signals transmitted/received by the repeater are identical, so that some of the signals output through the repeater may be re-input to the repeater directly or reflectedly through a space in a form of a feedback signal. The feedback signal is amplified by being combined with an original signal received from the base station or the mobile communication terminal, and then output through the repeater. When the above processes are repeated, the repeater oscillates.

In order to prevent such a phenomenon, an interference cancellation system (ICS) capable of canceling the feedback signal is being developed. Generally, the ICS includes an amplifier to perform a signal amplification function. The amplifier amplifies signals according to a predetermined amplification gain, but if the amplification gain is not properly set, the ICS may oscillate.

In particular, in a case of an ICS repeating a long term evolution (LTE) signal, a proper amplification gain may not be obtained due to a severe power level change over time. Therefore, there is a need for a method capable of setting an appropriate amplification gain so as to operate the ICS more stably.

SUMMARY

The inventive concept is directed to an interference cancellation repeater capable of stable signal amplification irrespective of a sudden change in a signal level of a long term evolution (LTE) signal.

According to an aspect of the inventive concept, there is provided an interference cancellation repeater for repeating a long term evolution (LTE) signal between a terminal and a base station, the interference cancellation repeater includes: an interference canceller configured to generate a restored LTE signal by canceling a feedback signal included in an input LTE signal; a sync signal detector configured to detect a first sync level which is a level with respect to a sync signal of the input LTE signal and a second sync level which is a level with respect to a sync signal of the restored LTE signal; and a gain controller configured to generate isolation using a difference between the first sync level and the second sync level.

According to an exemplary embodiment, the gain controller may be configured to control a signal amplifier using the isolation.

According to an exemplary embodiment, the sync signal detector may include a low-pass filter configured to detect a frequency band corresponding to the sync signal from each of the input LTE signal and the restored LTE signal; a timing detector configured to detect the sync signal corresponding to a predetermined timing from a signal passing through the frequency band; and a level detector configured to calculate a power level of the sync signal of each of the input LTE signal and the restored LTE signal and to detect the first sync level and the second sync level.

According to an exemplary embodiment, the sync signal may be at least one of a Primary Synchronization Signal (P-SS) and a Secondary Synchronization Signal (S-SS).

According to another aspect of the inventive concept, there is provided an interference cancellation repeater for repeating a long term evolution (LTE) signal between a terminal and a base station, the interference cancellation repeater includes: an interference canceller configured to generate a restored LTE signal by canceling a feedback signal included in an input LTE signal; a sync signal detector configured to detect a first sync level which is a level with respect to a sync signal of the input LTE signal and a second sync level which is a level with respect to a sync signal of the restored LTE signal; and a gain controller configured to control a signal amplifier using a difference between the first sync level and the second sync level.

According to an exemplary embodiment, the gain controller may be configured to calculate isolation by subtracting the difference from a previous amplification gain of the signal amplifier and to control the signal amplifier based on the isolation.

According to an exemplary embodiment, the sync signal detector may include: a low-pass filter configured to detect a frequency band corresponding to the sync signal from each of the input LTE signal and the restored LTE signal; a timing detector configured to detect the sync signal corresponding to a predetermined timing from a signal passing through the frequency band; and a level detector configured to calculate a power level of the sync signal of each of the input LTE signal and the restored LTE signal and to detect the first sync level and the second sync level.

According to an exemplary embodiment, the sync signal may be at least one of a Primary Synchronization Signal (P-SS) and a Secondary Synchronization Signal (S-SS).

According to an embodiment of the inventive concept, in an interference cancellation repeater, a stable signal amplification operation is possible by accurately detecting a sync signal having a constant power level regardless of a sudden change in traffic and determining an amplification gain.

BRIEF DESCRIPTION OF THE FIGURES

A brief description of each drawing is provided to more fully understand drawings recited in the detailed description.

DETAILED DESCRIPTION OF EXEMPLARY EMBODIMENTS

As the inventive concept allows for various changes and numerous embodiments, embodiments will be illustrated in the drawings and described in detail in the written description. However, this does not limit the inventive concept to specific example embodiments, and it should be understood that the inventive concept covers all the modifications, equivalents and replacements included within the scope of the inventive concept. In describing the inventive concept, in the following description, a detailed explanation of known related technologies may be omitted to avoid unnecessarily obscuring the subject matter of the inventive concept.

It will be understood that, although the terms first, second, etc. may be used herein to describe various elements, these elements should not be limited by these terms. These terms are only used to distinguish one element from another.

The terms used in this application, only certain embodiments have been used to describe, is not intended to limit the present embodiments. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the inventive concept will be described in detail with reference to the accompanying drawings.

Figure 1:
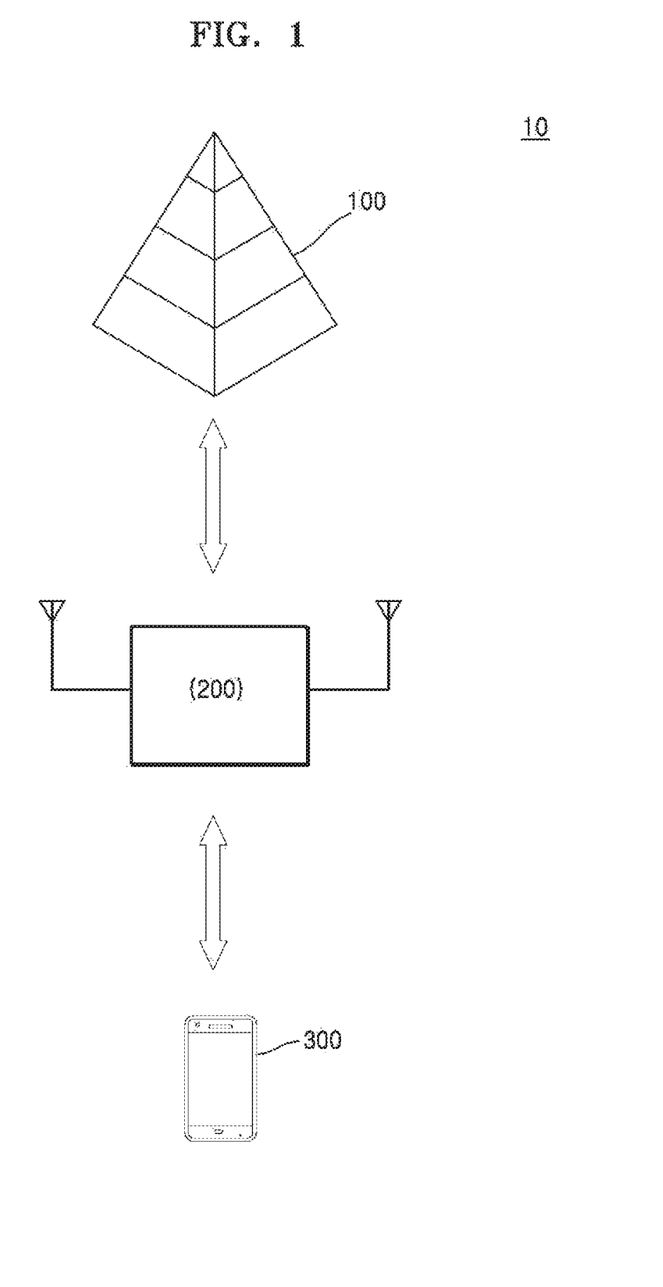
FIG. 1 is a configuration diagram of a mobile communication system according to an embodiment of the inventive concept.

FIG. 1 is a configuration diagram of a mobile communication system 10 according to an embodiment of the inventive concept.

Referring to FIG. 1, the mobile communication system 10 according to an embodiment of the inventive concept may include a base station 100, an interference cancellation repeater 200, and a mobile communication terminal 300.

The base station 100 and the interference cancellation repeater 200 may connect a mobile communication network to the mobile communication terminal 300 for a mobile communication service. That is, a signal transmitted from the mobile communication terminal 300 may be amplified by the interference cancellation repeater 200 and then transmitted to a receiving side (e.g., a receiver terminal (not shown)) via the base station 100. Furthermore, a signal transmitted from a transmitting side (e.g., a transmitter terminal (not shown)) may be amplified by the interference cancellation repeater 200 via the base station 100 and then transmitted to the mobile communication terminal 300. Here, when a distance between the base station 100 and the mobile communication terminal 300 is too long to smoothly transmit signals, the interference cancellation repeater 200 may perform signal amplification between the base station 100 and the mobile communication terminal 300.

A mobile communication network connected to the base station 100 may process outgoing calls and incoming calls of each base station through a connection with each base station controller (BSC), and may be operated by a mobile communication exchanger (not shown) connected to another network such as a Public Switch Telecommunication Network (PSTN) together with a central control function capable of efficiently operating all base stations.

A signal transmitted and received by each of the base station 100, the interference cancellation repeater 200, and the mobile communication terminal 300 may be a Long Term Evolution (LTE) signal, but the scope of the inventive concept is not limited thereto.

The interference cancellation repeater 200 may be implemented with an interference cancellation system (ICS) capable of canceling a signal to which some of signals transmitted by the interference cancellation repeater 200 are re-input directly or reflectedly through a space, that is, a feedback signal.

Figure 2:
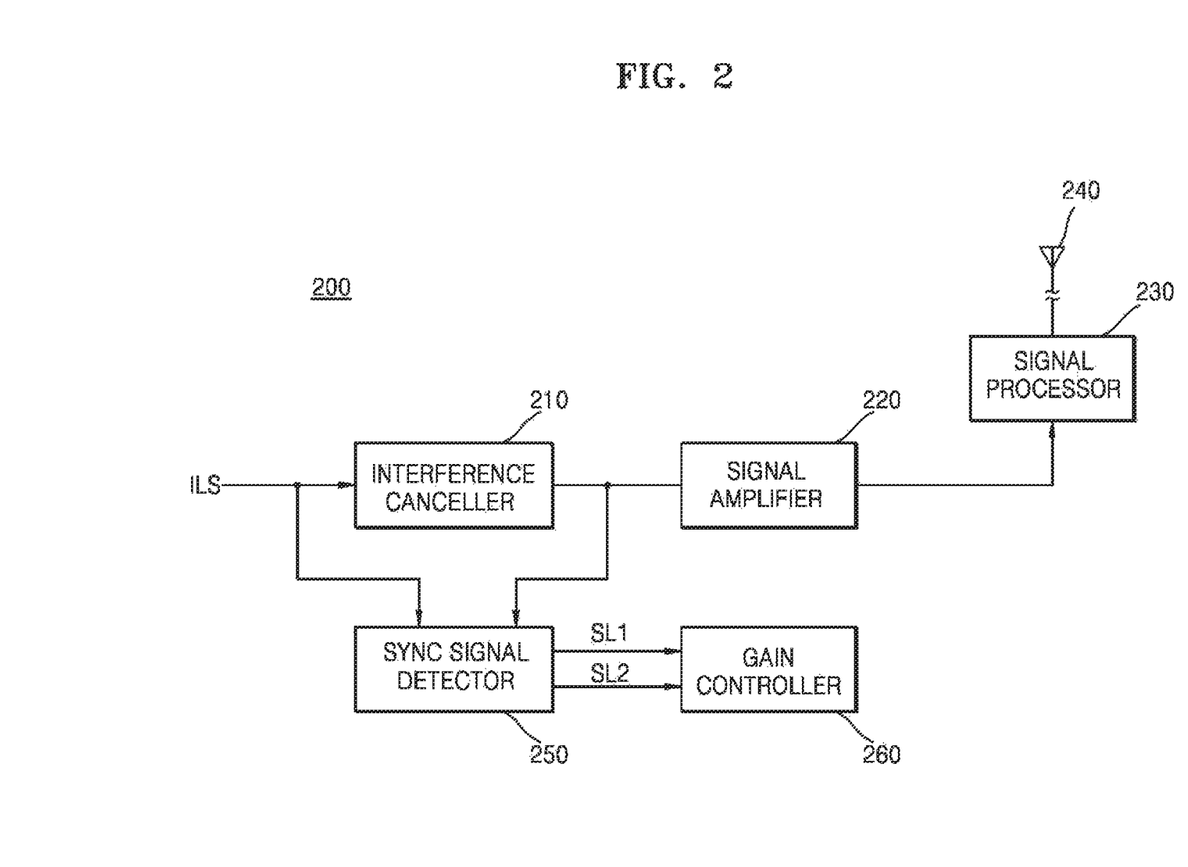
FIG. 2 is a configuration diagram of an interference cancellation repeater according to an embodiment of the inventive concept.
Figure 3:
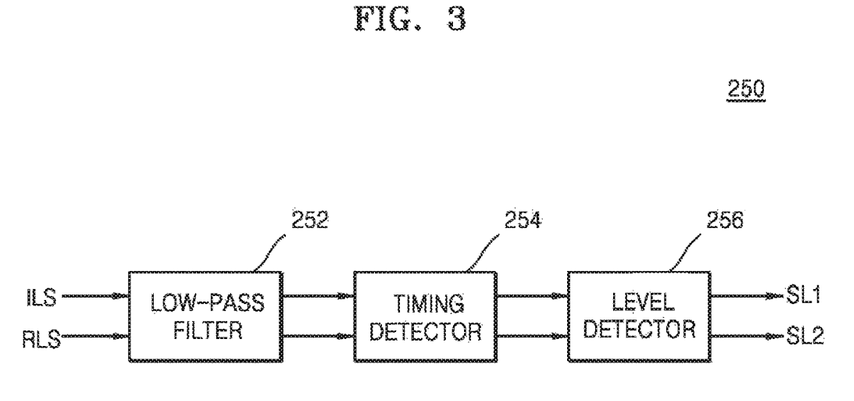
FIG. 3 is a configuration diagram of a sync signal detector according to an embodiment of the inventive concept.
Figure 4:
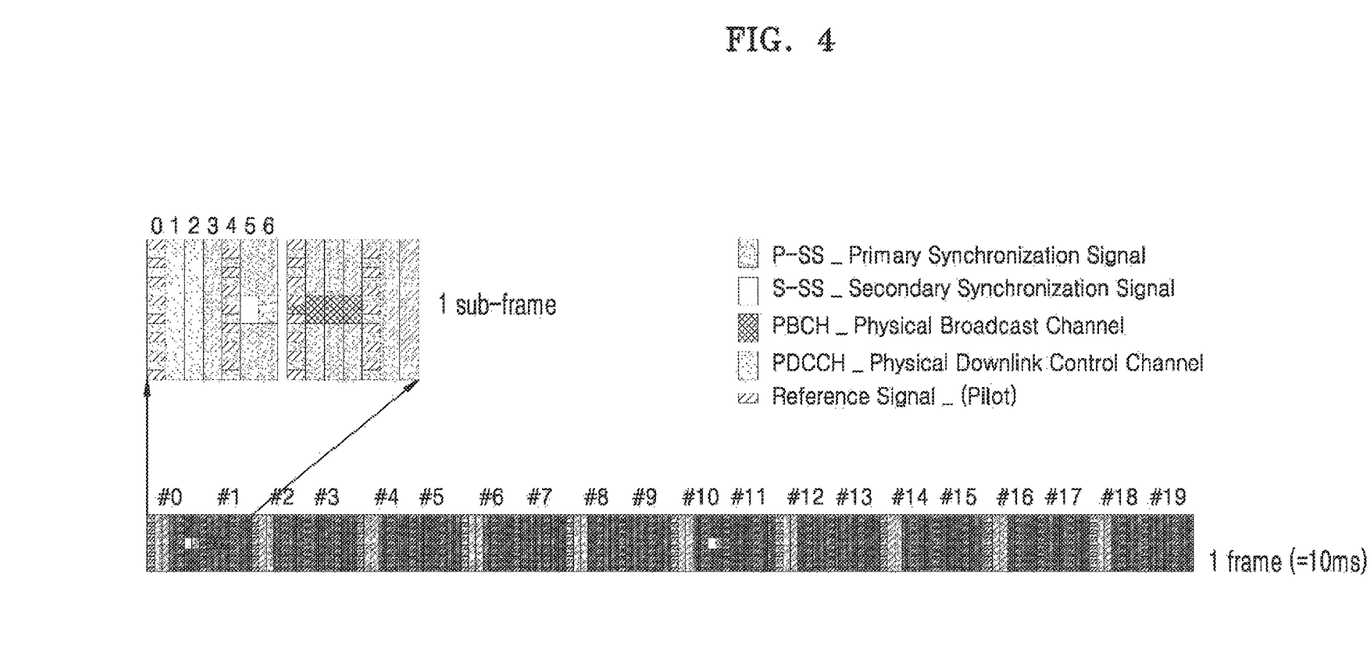
FIG. 4 is a view of a frame structure of an input long term evolution (LTE) signal.
Figure 5:
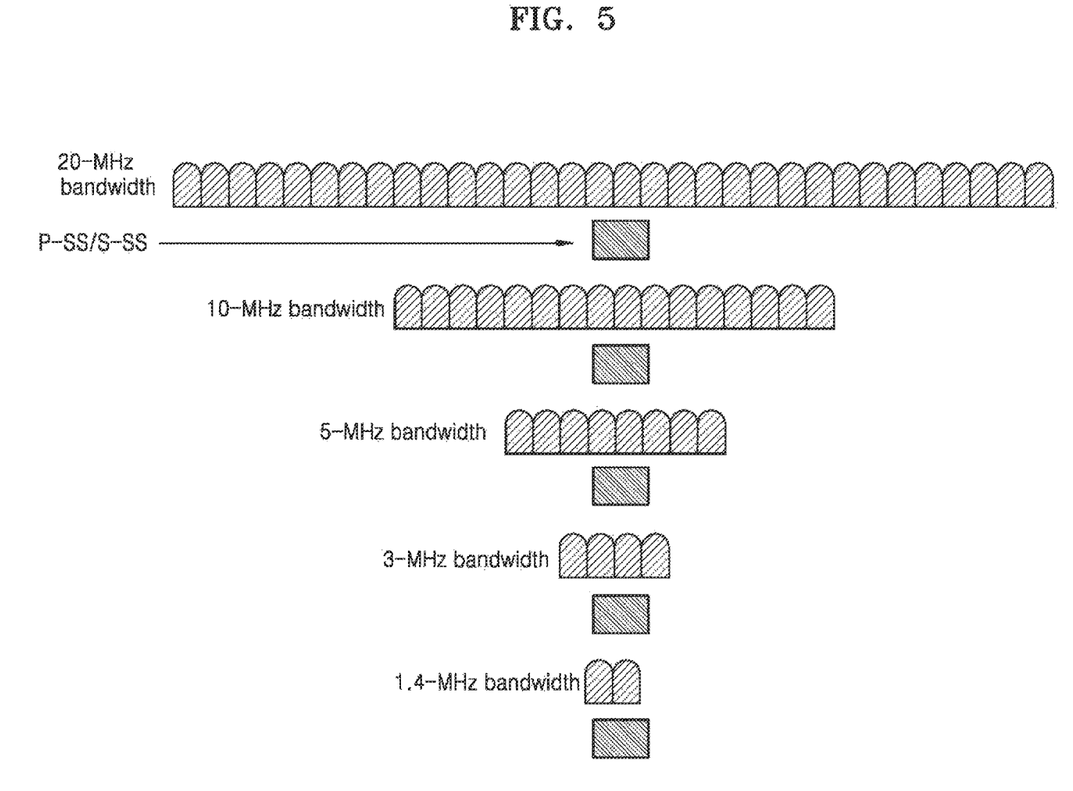
FIG. 5 is a view of locations of sync signals of an input LTE signal in various transmission frequency bands.
Figure 6:
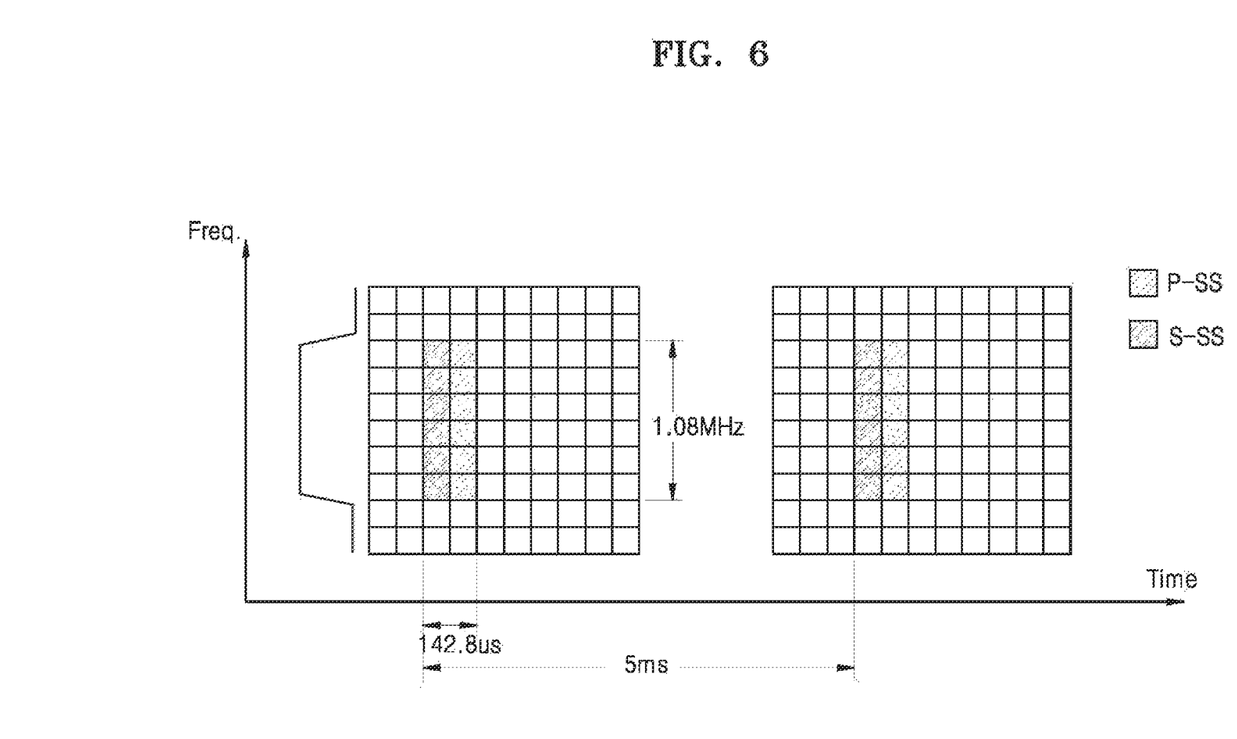
FIG. 6 is a view for explaining an operation of a sync signal detector according to an embodiment of the inventive concept.

FIG. 2 is a configuration diagram of the interference cancellation repeater 200 in FIG. 1. FIG. 3 is a configuration diagram of a sync signal detector in FIG. 2. FIG. 4 is a view of a frame structure of an LTE signal in FIG. 2. FIG. 5 is a view of locations of sync signals of an input LTE signal in various transmission frequency bands. FIG. 6 is a view for explaining an operation of the sync signal detector in FIG. 2.

Referring to FIGS. 1 to 6, the interference cancellation repeater 200 may include an interference canceller 210, a signal amplifier 220, a signal processor 230, a transmission antenna 240, a sync signal detector 250, and a gain controller 260.

The interference canceller 210 may generate a restored LTE signal RLS by canceling a feedback signal included in an input LTE signal ILS received through a reception antenna (not shown). The input LTE signal ILS is a signal combined an original signal transmitted from the base station 100 and a feedback signal transmitted through the transmission antenna 240. The restored LTE signal RLS is a signal obtained by canceling the feedback signal from the input LTE signal and restoring the original signal. According to an embodiment, the interference canceller 210 may determine that a signal having the same waveform as the waveform of a signal previously transmitted through the transmission antenna 240 is a feedback signal, and may cancel the feedback signal from the input LTE signal to generate the restored LTE signal RLS. Each of the input LTE signal ILS and the restored LTE signal RLS may be an analog or digital signal.

The signal amplifier 220 may amplify and output the restored LTE signal RLS under the control of the gain controller 260. That is, the signal amplifier 220 may amplify and output the restored LTE signal RLS according to an amplification gain determined by the gain controller 260. The signal processor 230 may perform signal processing (e.g., noise cancellation, digital-to-analog conversion, and the like) on the amplified restored LTE signal RLS and transmit the processed signal to the transmission antenna 240.

The transmission antenna 240 may transmit the signal received from the signal processor 230 to the outside of the interference cancellation repeater 200. The sync signal detector 250 may detect a sync signal of the input LTE signal ILS and may further detect a first sync level SL1 which is a level with respect to the sync signal. The sync signal detector 250 may detect a sync signal of the restored LTE signal RLS and may further detect a second sync level SL2 which is a level with respect to the sync signal.

In FIG. 3, the sync signal detector 250 may include a low-pass filter 252, a timing detector 254, and a level detector 256. The low-pass filter 252 may detect a frequency band corresponding to the sync signal from each of the input LTE signal ILS and the restored LTE signal RLS.

In FIG. 4, one frame of the input LTE signal ILS (or the restored LTE signal RLS) may include at least one sub-frame. The sub-frame includes a Primary Synchronization Signal (P-SS), a Secondary Synchronization Signal (S-SS), a Physical Broadcast Channel (PBCH), a Physical Downlink Control Channel (PDCCH), and a reference signal. The P-SS and S-SS are sync signals, which are signals used by a user to synchronize after cell search. The PBCH is a signal including system information called a Master Information Block (MIB). The PDCCH is a signal including information on downlink scheduling assignment and uplink scheduling grant. The reference signal is a signal used by a receiving side of the signal to estimate a channel. That is, the P-SS and/or S-SS may refer to the sync signal described above in the description of the sync signal detector 250.

In FIG. 5, the input LTE signal ILS is parallelized in a transmission frequency band that varies depending on the amount of traffic to be transmitted by an Orthogonal Frequency-Division Multiplexing (OFDM) method, and is expanded and transmitted over sub-carriers. For example, if there is a large amount of traffic to be transmitted, the input LTE may be transmitted over many sub-carriers in a transmission frequency band of 20-MHz. However, when the amount of traffic to be transmitted is small, the transmission frequency band becomes smaller than the transmission frequency band of 20-MHz in proportion to the amount of the traffic (transmission frequency bands of 10, 5, 3, and 1.4-MHz). The transmission frequency bands in FIG. 5 are merely examples, and the scope of the inventive concept is not limited thereto.

Here, since a power level of the input LTE signal ILS may be expressed by a sum of the average power of sub-carriers included in a transmission frequency band, the power level becomes higher as the transmission frequency band becomes greater. However, as illustrated in FIG. 5, the P-SS and S-SS are transmitted only in a specific frequency band even if the transmission frequency band is changed according to the amount of the traffic, and transmission power at the base station 100 of each of the P-SS and S-SS may be kept constant regardless of the amount of traffic.

In FIG. 6, the low-pass filter 252 may be a filter that detects a frequency band (for example, about 1.08 MHz) corresponding to a sync signal from each of the input LTE signal ILS and the restored LTE signal RLS. Therefore, when each of the input LTE signal ILS and the restored LTE signal RLS passes through the low-pass filter 252, only a signal corresponding to the frequency band (corresponding to the sync signal) is transmitted to the timing detector 254.

By using a characteristic in which a sync signal is transmitted for a predetermined period of time (e.g., 142.8 us) at a predetermined period (e.g., 5 ms) as determined in the LTE standard in each of the input LTE signal and the restored LTE signal, the timing detector 254 may detect each sync signal. That is, the timing detector 254 may detect a sync signal corresponding to a predetermined timing determined based on a period and a transmission time of the sync signal.

The level detector 256 may calculate a power level corresponding to an average power by calculating a moving average from the sync signal of each of the input LTE signal ILS and the restored LTE signal RLS detected by the timing detector 254. The level detector 256 may output the calculated power levels as a first sync level SL1 of the input LTE signal ILS and a second sync level SL2 of the restored LTE signal RLS, respectively.

Referring again to FIG. 2, the gain controller 260 may calculate isolation based on the first sync level SL1 and the second sync level SL2. The isolation may be calculated by the following equation.

Isolation=amplification gain−(SL1−SL2)

Here, the amplification gain may be a value set in advance in the signal amplifier 220 and may be information on how much a signal input to the signal amplifier 220 is amplified.

A difference between the first sync level SL1 of the sync signal included in the input LTE signal ILS and the second sync level SL2 of the sync signal included in the restored LTE signal RLS may represent magnitude of the feedback signal included in the input LTE signal ILS. That is, since the transmission power of the P-SS and S-SS, which are sync signals, are kept constant regardless of the amount of traffic and the P-SS and S-SS are signals that appear according to a certain period and time in a specific frequency band, the magnitude of the feedback signal may be represented accurately. In other words, each of the first sync level SL1 and the second sync level SL2 is independent of a total power level (which can be calculated as a sum of the average power of sub-carriers included in a corresponding transmission frequency band in FIG. 5) of the input LTE signal ILS and the restored LTE signal RLS, the total power level varies depending on a traffic change. The isolation is obtained by subtracting the magnitude (SL1-SL2) of the feedback signal included in the input LTE signal ILS from a previous amplification gain and means attenuation of signal intensity by the feedback signal.

The gain controller 260 may determine a current amplification gain of the signal amplifier 220 based on the calculated isolation. In more detail, the gain controller 260 may determine an amplification gain of the signal amplifier 220 by comparing predetermined reference isolation with newly calculated isolation (hereinafter, referred to as "calculated isolation"). For example, when the calculated isolation is equal to or higher than the reference isolation, the gain controller 260 determines that isolation is sufficiently secured and oscillation do not occur and may increase the amplification gain. Meanwhile, when the calculated isolation is less than the reference isolation, the gain controller 260 determines that isolation is not sufficiently secured and oscillation occurs and may reduce the amplification gain.

As described above, the calculation of the isolation for determining the current amplification gain is a very important process for a stable operation of the interference cancellation repeater 200 by preventing oscillation of the interference cancellation repeater 200. Furthermore, since the current amplification gain is a factor for determining coverage which means a communication area of the interference cancellation repeater 200, an appropriate amplification gain needs to be selected in order to prevent overlapping of coverage with adjacent cells and to enlarge the communication area of the base station 100.

For example, if the magnitude of the feedback signal is calculated by subtracting the total power level of each of the input LTE signal ILS and the restored LTE signal RLS, due to a characteristic of an LTE signal with a large instantaneous variation of a transmission frequency band depending on the amount of traffic, the input LTE signal ILS and the restored LTE signal RLS themselves are largely shaken and errors in the calculation of the isolation are likely to occur. In contrast, according to an embodiment of the inventive concept, in the interference cancellation repeater 200, a stable signal amplification operation is possible by accurately detecting a sync signal having a constant power level regardless of the amount of traffic and determining an amplification gain. In addition, according to the interference cancellation repeater 200 according to an embodiment of the inventive concept, it is possible to secure stable coverage by determining an amplification gain by minimizing errors in calculation of isolation.

The method of operating the interference cancellation repeater 200 according to the inventive concept can be embodied as computer-readable codes on a non-transitory computer-readable recording medium. The non-transitory computer-readable recording medium is any recording medium that can store data which can thereafter be read by a computer system. The non-transitory computer-readable recording medium may include, for example, read-only memory (ROM), random-access memory (RAM), magnetic tapes, magnetic disks, flash memory, optical data storage devices, etc. The non-transitory computer-readable recording medium can also be distributed over computer network-coupled computer systems so that a computer-readable code is stored and executed in a distributive manner.

While the embodiments have been particularly shown and described, it will be understood by those of ordinary skill in the art that various changes in form and details may be made therein without departing from the scope of the inventive concept as defined by the appended claims.

The invention claimed is:

1. An interference cancellation repeater for repeating a long term evolution (LTE) signal between a terminal and a base station, the interference cancellation repeater comprising at least one processor to implement:
    an interference canceller configured to generate a restored LTE signal by canceling a feedback signal included in an input LTE signal;
    a signal detector configured to detect a first signal included in a specific frequency band of the input LTE signal and a second signal included in the specific frequency band of the restored LTE signal, and detect a first power level of the first signal and a second power level of the second signal;
    a signal amplifier configured to amplify the restored LTE signal by an amplification gain and output the amplified LTE signal; and
    a gain controller configured to generate isolation based on the amplification gain and a difference between the first power level and the second power level, and control the amplification gain using the generated isolation.

2. The interference cancellation repeater of claim 1, wherein
    the signal detector comprises:
    a low-pass filter configured to pass the specific frequency band corresponding to the first signal and the second signal;
    a timing detector configured to detect the first signal and the second signal from an output signal of the low-pass filter at a predetermined timing; and
    a level detector configured to detect the power level of the first signal and the power level of the second signal.

3. The interference cancellation repeater of claim 1, wherein
    the first signal or the second signal comprises at least one of a Primary Synchronization Signal (P-SS) and a Secondary Synchronization Signal (S-SS).

4. The interference cancellation repeater of claim 1, wherein
    the gain controller is configured to generate the isolation by subtracting the difference from a previous amplification gain of the restored LTE signal.

5. A method for operating of an interference cancellation repeater, the method comprising:
    generating a restored LTE signal by canceling a feedback signal included in an input LTE signal;
    detecting a first signal included in a specific frequency band of the input LTE signal and a second signal included in the specific frequency band of the restored LTE signal;
    detecting a first power level of the first signal and a second power level of the second signal;
    generating isolation based on an amplification gain and a difference between the first power level and the second power level; and
    controlling the amplification gain of the restored LTE signal using the generated isolation.

6. The method of claim 5, wherein the detecting the first signal and the second signal comprises detecting the first signal and the second signal at a predetermined timing.

7. The method of claim 5, wherein the first signal or the second signal comprises at least one of a Primary Synchronization Signal (P-SS) and a Secondary Synchronization Signal (S-SS).

8. The method of claim 5, wherein the generating isolation comprises generating the isolation by subtracting the difference from a previous amplification gain.

* * * * *